(12) United States Patent
Taslimi (10) Patent No.: US 10,452,260 B2
(45) Date of Patent: Oct. 22, 2019

(54) MANAGING WORKFLOW TASKS IN TOUCH SCREEN MOBILE DEVICES

(71) Applicant: Nintex Pty Ltd, Melbourne, Victoria (AU)

(72) Inventor: Vahid Taslimi, Southbank (AU)

(73) Assignee: NINTEX PTY LTD, George Town (KY)

( * ) Notice: Subject to any disclaimer, the term of this patent is extended or adjusted under 35 U.S.C. 154(b) by 0 days.

(21) Appl. No.: 15/528,363

(22) PCT Filed: Nov. 20, 2015

(86) PCT No.: PCT/IB2015/058993
§ 371 (c)(1),
(2) Date: May 19, 2017

(87) PCT Pub. No.: WO2016/079715
PCT Pub. Date: May 26, 2016

(65) Prior Publication Data
US 2017/0357435 A1    Dec. 14, 2017

Related U.S. Application Data

(60) Provisional application No. 62/082,824, filed on Nov. 21, 2014.

(51) Int. Cl.
*G06F 3/0488* (2013.01)
*G06F 3/0482* (2013.01)
*G06Q 10/06* (2012.01)

(52) U.S. Cl.
CPC ........ *G06F 3/04883* (2013.01); *G06F 3/0482* (2013.01); *G06Q 10/0633* (2013.01)

(58) Field of Classification Search
CPC .............................. G06F 3/04883; G06F 8/427
See application file for complete search history.

(56) References Cited

U.S. PATENT DOCUMENTS

| | | | |
|---|---|---|---|
| 2013/0246930 A1* | 9/2013 | Paushkina | G06F 3/017 715/739 |
| 2013/0263043 A1* | 10/2013 | Sarbin | G06F 3/0488 715/784 |
| 2015/0006392 A1* | 1/2015 | Brand | G06Q 20/38215 705/44 |

OTHER PUBLICATIONS

Updated mobile apps: notifications & attachments (Asana's Blog Post), Jun. 13, 2013, https://blog.asana.com/2013/06/mobile_updates/ (Year: 2013).*

* cited by examiner

*Primary Examiner* — Rayeez R Chowdhury
(74) *Attorney, Agent, or Firm* — K&L Gates LLP (57) ABSTRACT

A method, comprising: displaying a list of tasks on a touch-sensitive display of a mobile device; detecting a gesture on one of the tasks in the list that satisfies a predetermined condition corresponding to an action relating to the one task; and in response to the gesture satisfying the predetermined condition, executing the action in relation to the one task.

11 Claims, 14 Drawing Sheets

MANAGING WORKFLOW TASKS IN TOUCH SCREEN MOBILE DEVICES

PRIORITY CLAIM

The present application is a national stage entry of International Application No. PCT/IB2015/058993, filed on Nov. 20, 2015, which claims priority to U.S. Provisional Patent Application No. 62/082,824 filed on Nov. 21, 2014. The entire disclosure of each of these applications is incorporated by reference herein.

FIELD

The present disclosure generally relates to managing workflow tasks in touch screen mobile devices, such as smartphones or tablets.

BACKGROUND

Workflow management software is used to model and manage a defined sequence of tasks, events, actions or activities defined and arranged as a workflow having a start and an end. An important function of workflow management software is executing, actioning or deciding individual tasks that comprise the workflow.

Workflow management software is typically provided as web-based applications. In web-based workflow management applications, workflow tasks are conventionally managed and executed using multiple graphical user interface (GUI) elements such as text boxes, check boxes and input buttons.

As people are moving to rely more and more on mobile computing, workflow management software is increasingly being provided as mobile applications. However, the user interfaces elements conventionally used to manage and execute workflow tasks in web-based workflow management applications do not translate easily to interfaces in mobile devices.

Thus, there is a need for improved solutions for managing workflow tasks in touch screen mobile devices.

SUMMARY

According to the present invention to an example of the present disclosure, there is provided a method, comprising:

displaying a list of tasks on a touch-sensitive display of a mobile device; a workflow action within a workflow defined by a business workflow application;

detecting a swipe gesture on the touch-sensitive display that corresponds to approval of the workflow action; and in response to the swipe gesture, updating the workflow within the business workflow application to record the workflow action as approved.

The present invention also provides a non-transitory computer-readable medium comprising computer-executable instructions, wherein execution of the computer-readable instructions by one or more computing devices causes the one or more computing devices to: display, on a touch-sensitive display of a mobile device, a workflow action within a workflow defined by a business workflow application; detect a swipe gesture on the touch-sensitive display that corresponds to approval of the workflow action; and in response to the swipe gesture, update the workflow within the business workflow application to record the workflow action as approved.

BRIEF DESCRIPTION OF DRAWINGS

Example embodiments of the present disclosure will now be described by way of example only with reference to the accompanying drawings, in which.

DETAILED DESCRIPTION

Referring to the drawings, example embodiments of the present disclosure provide a method 100 for managing workflow tasks in a mobile device having a touch-sensitive display 200. The mobile device may be a smartphone or a tablet. The operations of the method 100 may be implemented by one or more software modules of a mobile application executed on the mobile device. The one or more software modules may be embodied in a non-transitory computer-readable medium storing computer-executable instructions for performing the operations of the method 100. The mobile application may be a workflow management mobile application ("app"), for example, the Nintex® Mobile App incorporating Nintex® Workflow.

Figure 1:
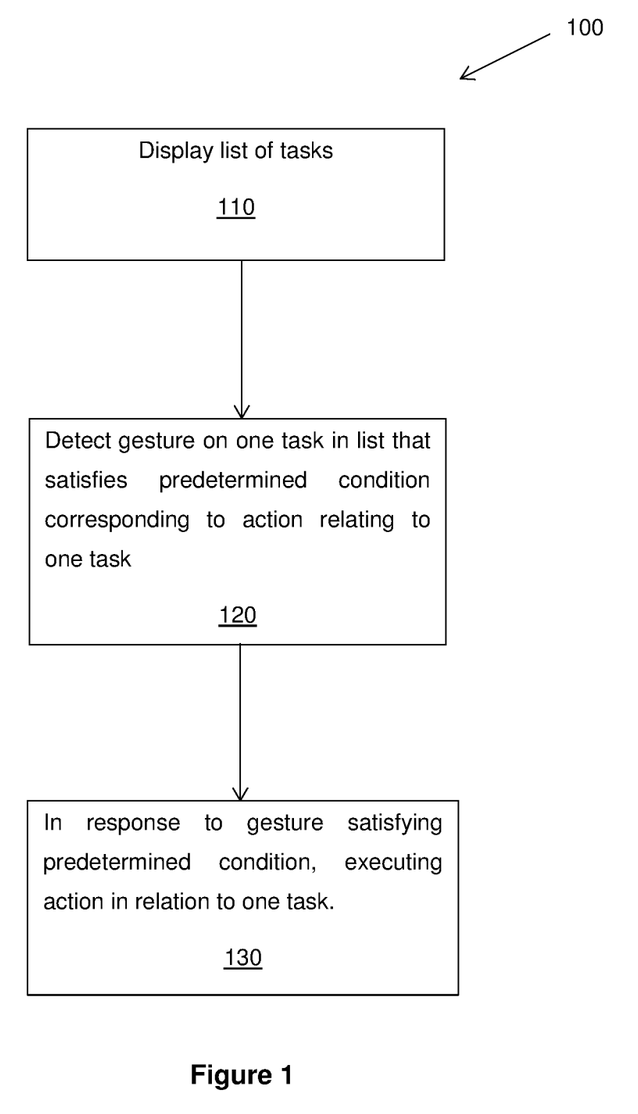
FIG. 1 is a flowchart of a computer-implemented method for managing-workflow tasks in a touch screen mobile device according to an example embodiment of the invention.
Figure 2:
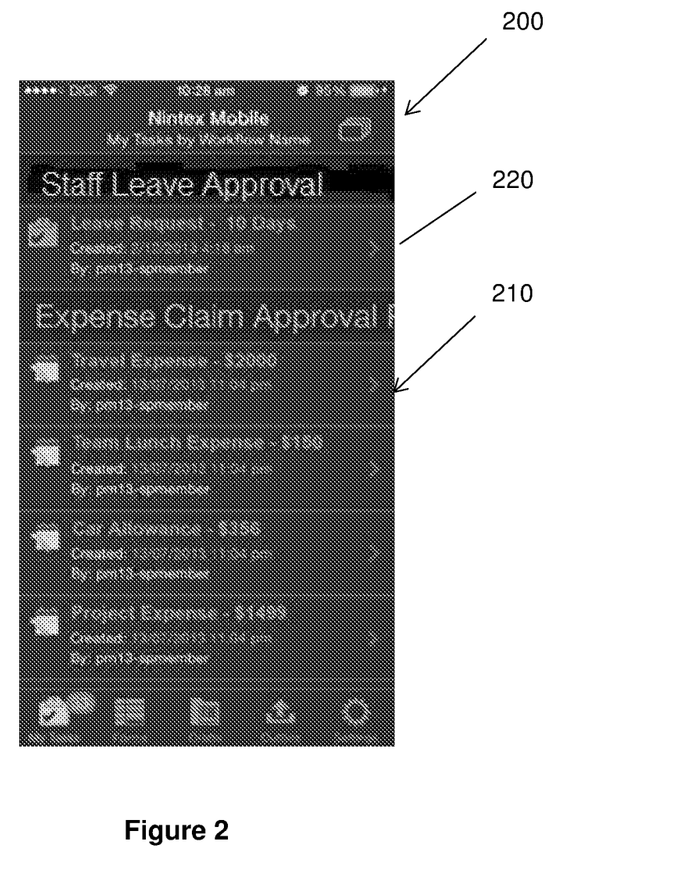
FIGS. 2 to 9 illustrate displays of a touch screen mobile device at various points of performance of gestures for managing workflow tasks in a workflow management mobile application, according to example embodiments of the invention.

Referring to FIGS. 1 and 2, the method 100 starts at 110 by displaying a list of tasks 210 on the touch-sensitive display 200 of the mobile device 310. The list of tasks 210 may comprise workflow tasks generated by the workflow management mobile app.

Figure 3:
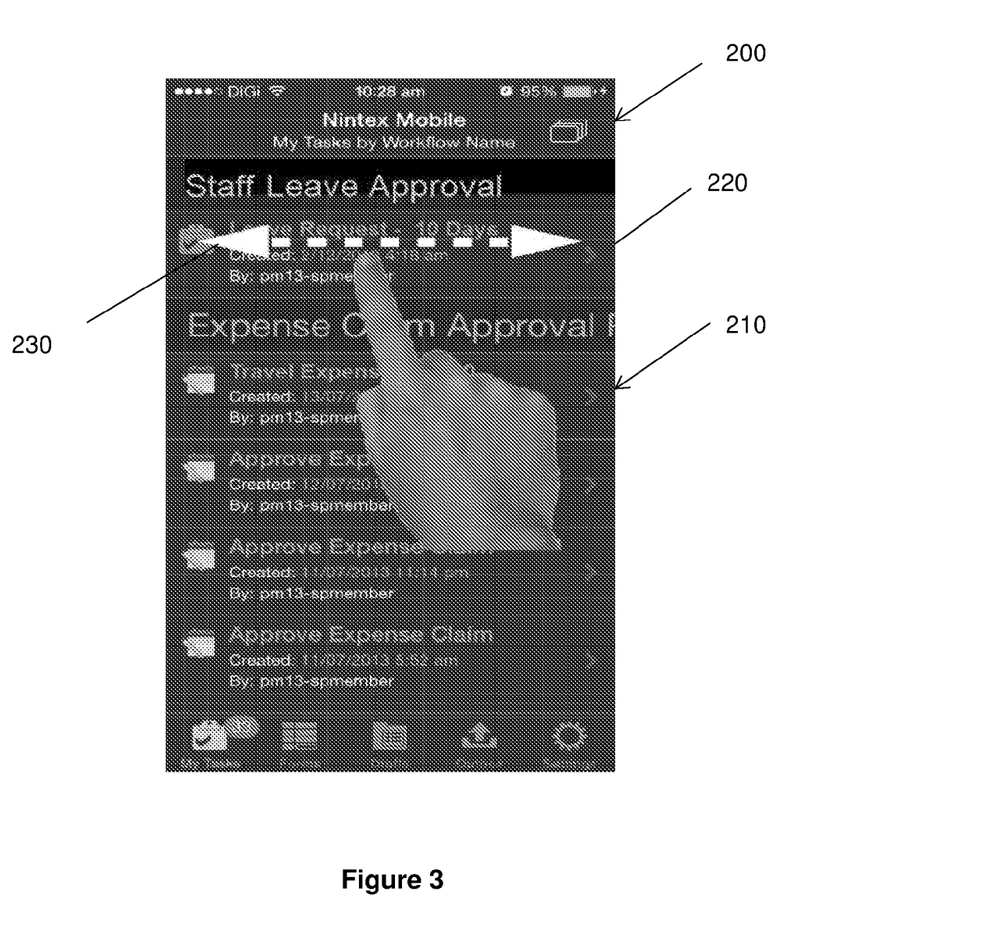
Figure 4:
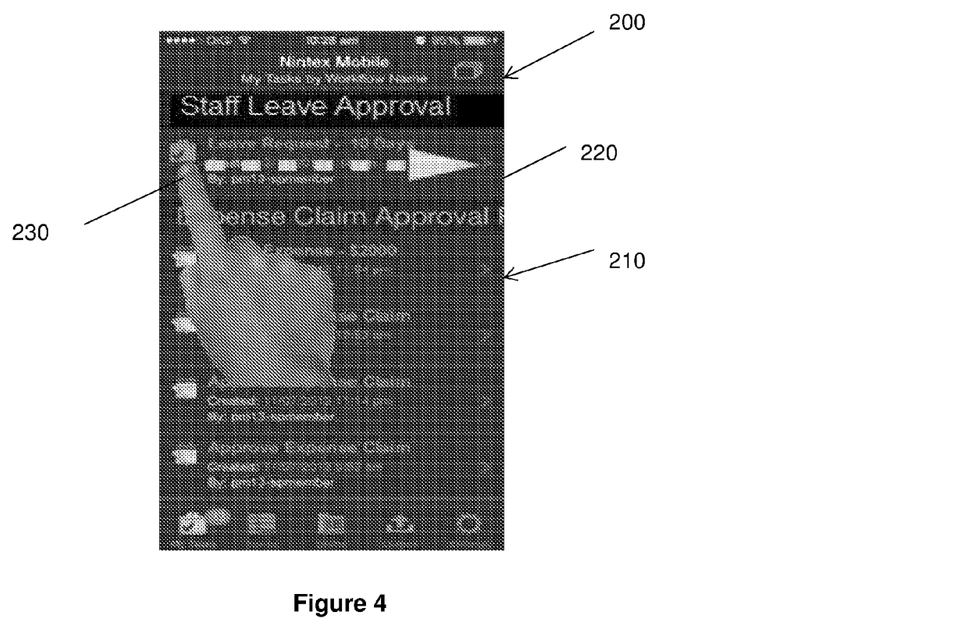
Figure 5:
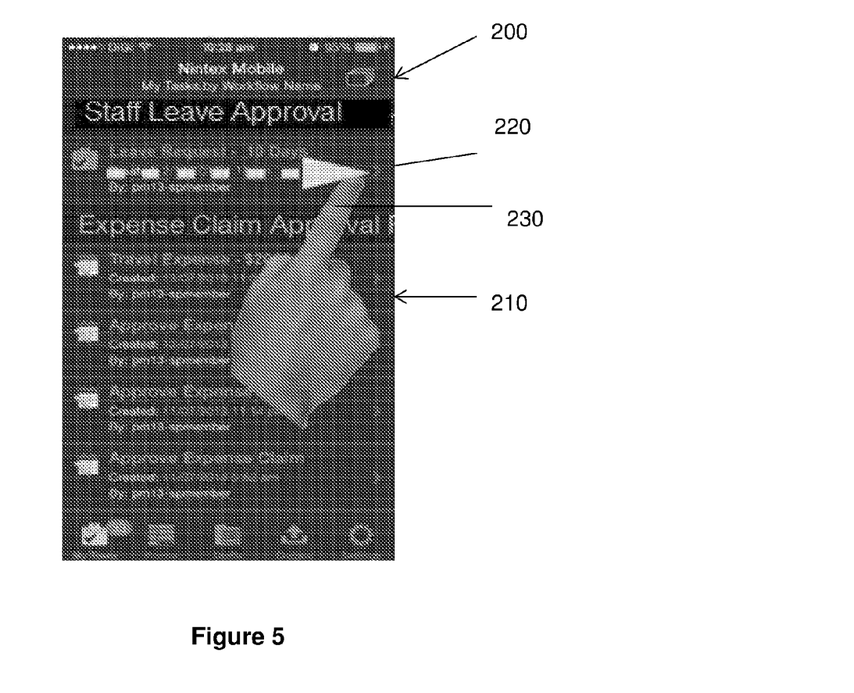

At 120, a gesture 230 is detected on one of the tasks 220 in the list that satisfies a predetermined condition corresponding to an action relating to the one task 220. The predetermined condition satisfied by the gesture 230 may comprise one or more of a touch gesture duration, direction, distance and starting point. Referring to FIGS. 3 to 5, the gesture 230 may, for example, be a left or right horizontal swipe gesture. Other equivalent, additional or alternative swipe gestures with different starting points, distances, durations and directions may also be used. The action may comprise a decision or an outcome relating to the one task 220. For example, the decision or outcome may comprise approving or rejecting the one task 220. Other equivalent, additional or alternative actions associated with workflow tasks may also be used.

Figure 9:
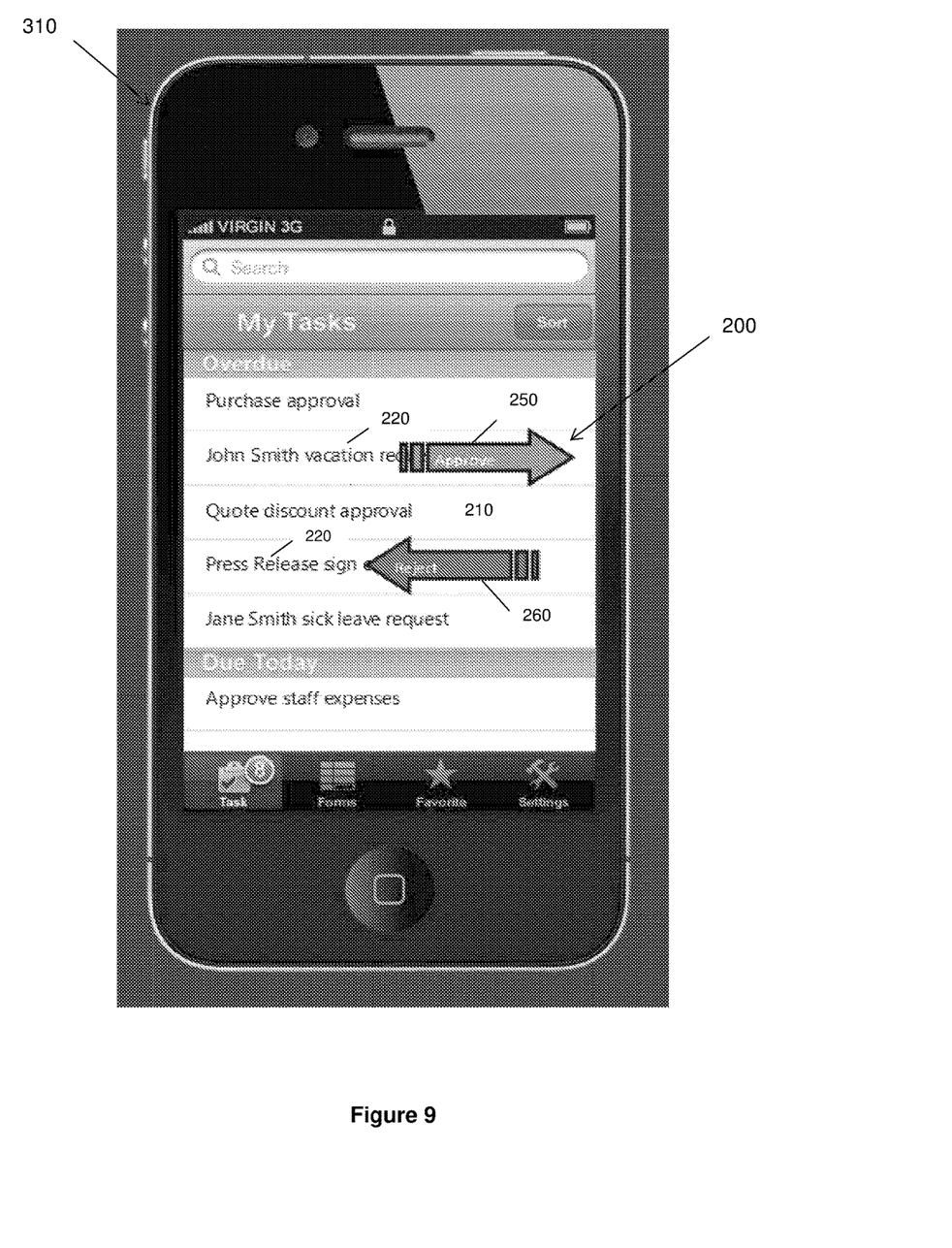

Referring to FIG. 9, after detecting a gesture on the one task 220, indicators 250, 260 of user-selectable swipe gestures 230 associated with corresponding actions may be displayed on or adjacent to the one task 220. The indicators 250, 260 may display binary actions to be executed in relation to the one task 220, and indicate starting points and directions of the corresponding swipe gestures 230. For example, the indicators 250, 260 may be displayed as left and right horizontal arrows. Other equivalent, additional or alternative indicators may also be used.

Figure 6:
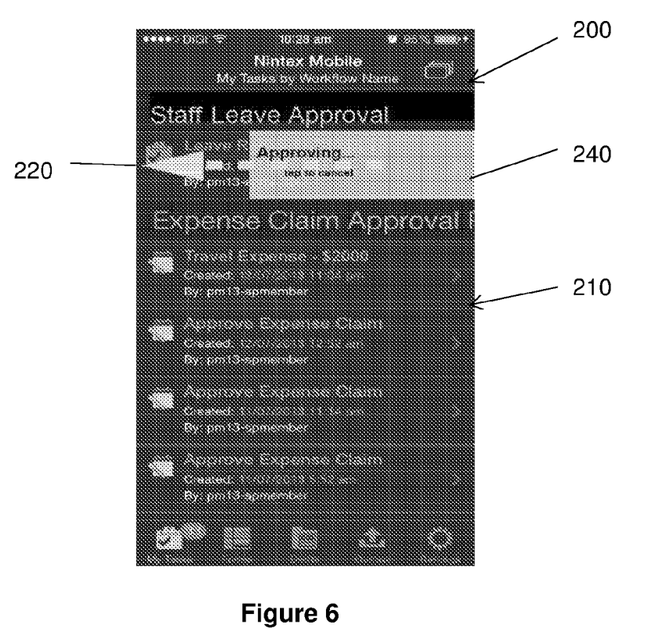
Figure 7:
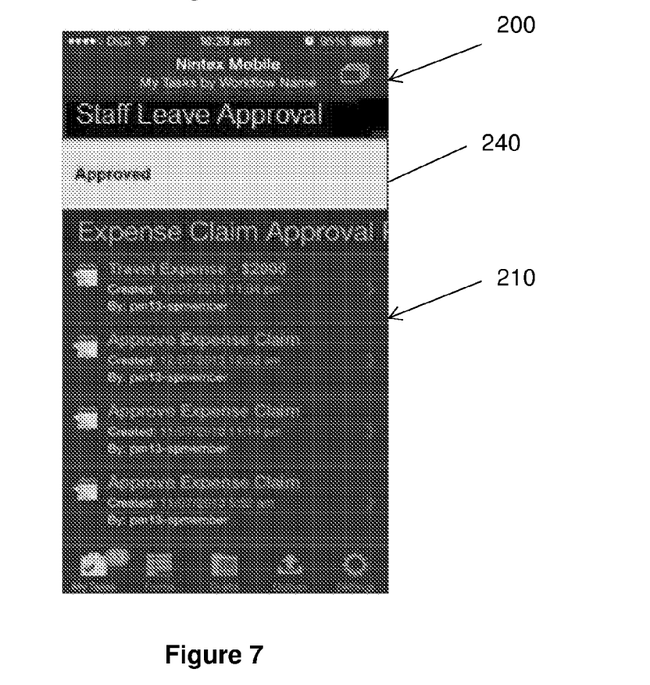

Referring to FIGS. 6 and 7, the method 100 may optionally further comprise, after detecting the swipe gesture 230, displaying a countdown bar 240 over the one task 220 for a predetermined time before executing the action in relation to the one task 220. The countdown bar 240 may display the action to be executed in relation to the one task 220. The method 100 may further comprise cancelling executing the action in response to detecting a gesture, for example a tap gesture, on the countdown bar 240 within the predetermined time.

Figure 8:
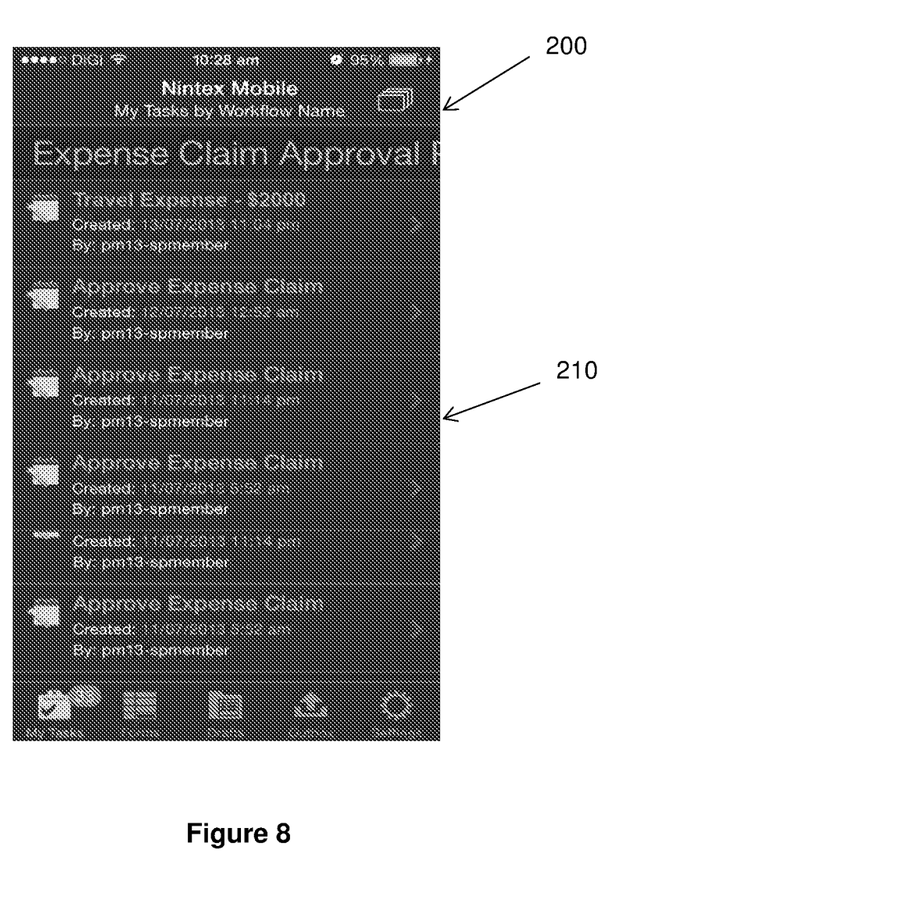

At 130, in response to the gesture 230 satisfying the predetermined condition, the workflow management mobile app may execute the action in relation to the one task 220. FIG. 8 illustrates that the list of tasks 210 may be updated to remove the one task 220 executed in response to the swipe gesture 230.

Figure 10:
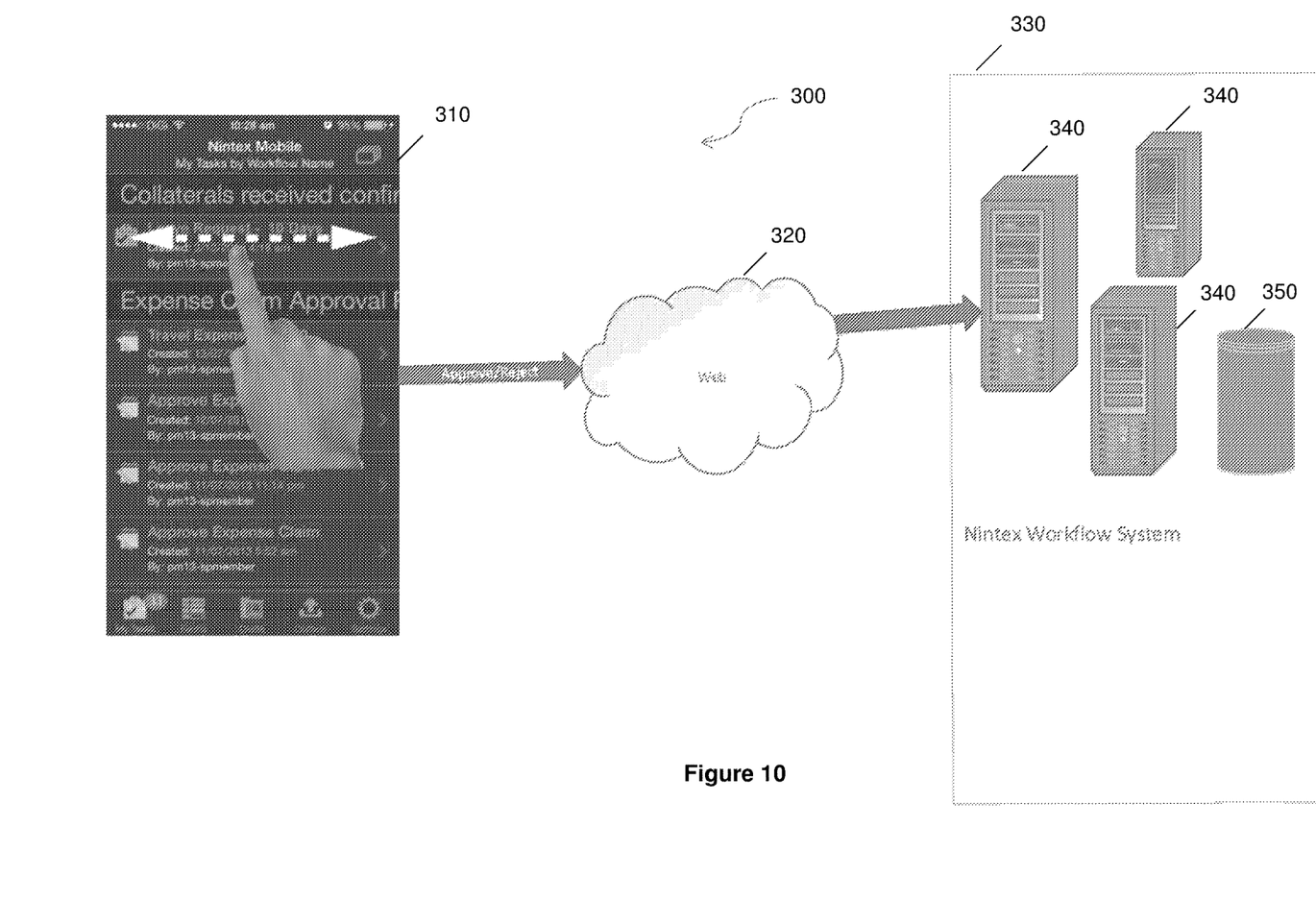
FIG. 10 is a schematic diagram of a system for implementing example embodiments of the invention.

FIG. 10 illustrates an example network data processing system 300 in which embodiments of the present invention may be implemented. The network data processing system 300 may comprise a mobile device 310 having a touch-sensitive display 200 in communication via a network 320 with a workflow management server platform 330 comprising servers 340 and storage 350. The system 300 may further comprise a mobile application executing at the mobile device 310 to display, on the touch-sensitive display 200, a list of tasks stored at the server 340, 350. The mobile application may also detect a gesture on one of the tasks in the list that corresponds to a decision outcome relating to the one task, and communicate the decision outcome relating to the one task to the server 340. The system 300 may further comprise a server application executing at the server 340 to update the list of tasks stored at the server 340, 350 based on the decision outcome relating to the one task communicated from the mobile device 310. The server application may also communicate the updated list of tasks from the server 340 to the mobile device 310.

Figure 11:
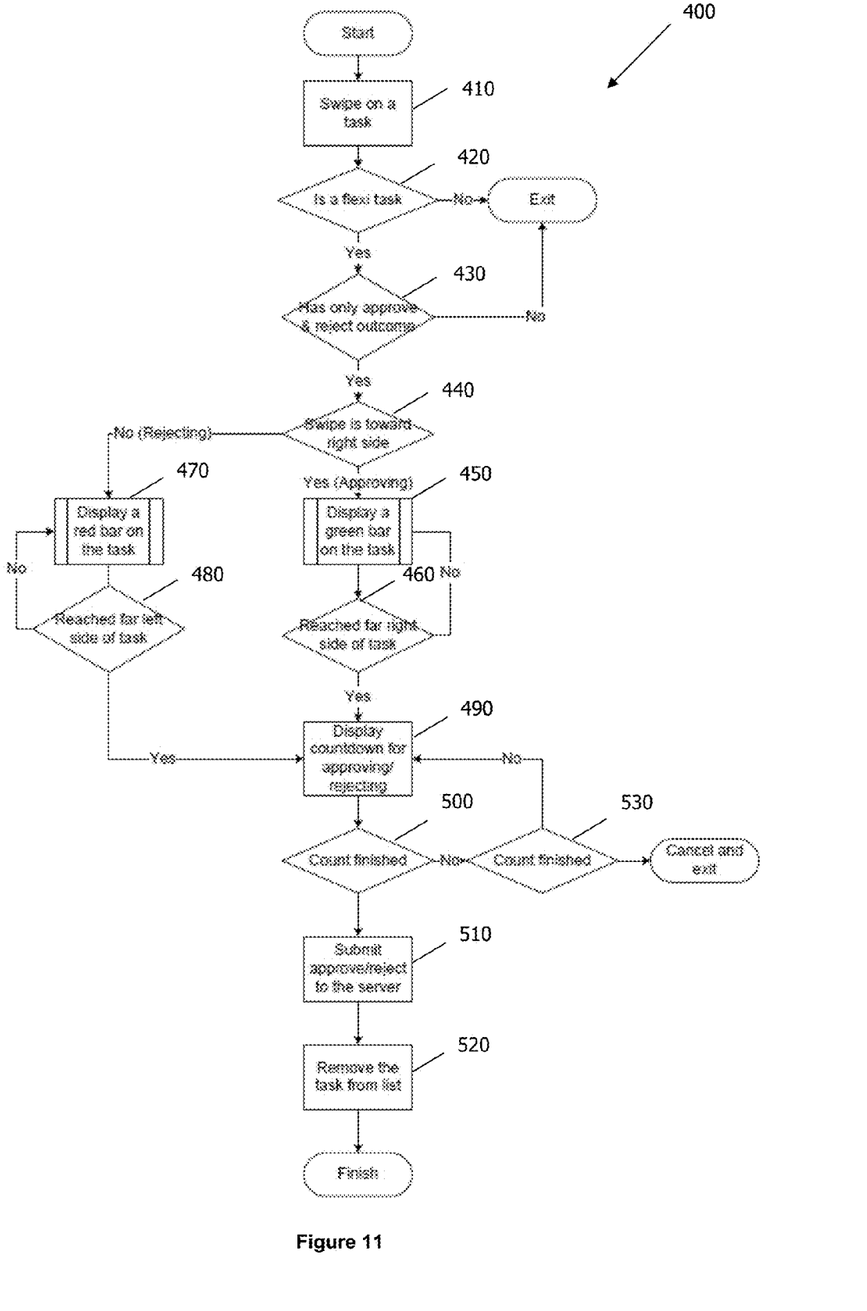
FIG. 11 is a flowchart of the method according to another example embodiment of the invention.

FIG. 11 is a flowchart of another example method 400, according to an example embodiment of the invention. At 410, a swipe gesture is detected on a task in a task list displayed on the touch-sensitive display 200 of the mobile device 310. At 420 and 430, it is determined if the task has decision outcomes of "approve" or "reject". If so, the direction of the swipe is determined at 440. At 450 and 460, a green bar is displayed on the task to visually signify user approval of the task if the direction of the swipe reaches the far right hand side of the touch-sensitive display 200. Conversely, at 470 and 480, a red bar is displayed on the task to visually signify user rejection of the task if the direction of the swipe reaches the far left hand side of the touch-sensitive display 200. A countdown for approving or rejecting the task is then displayed at 490. If the countdown finishes at 500, the approval or rejection of the task is submitted via the network 320 to the server 340 at 510. The task is then removed from the task list by the server 340 at 520. If the user taps on the task before the countdown at 500 finishes, the approval or rejection of the task is cancelled at 530.

Figure 12:
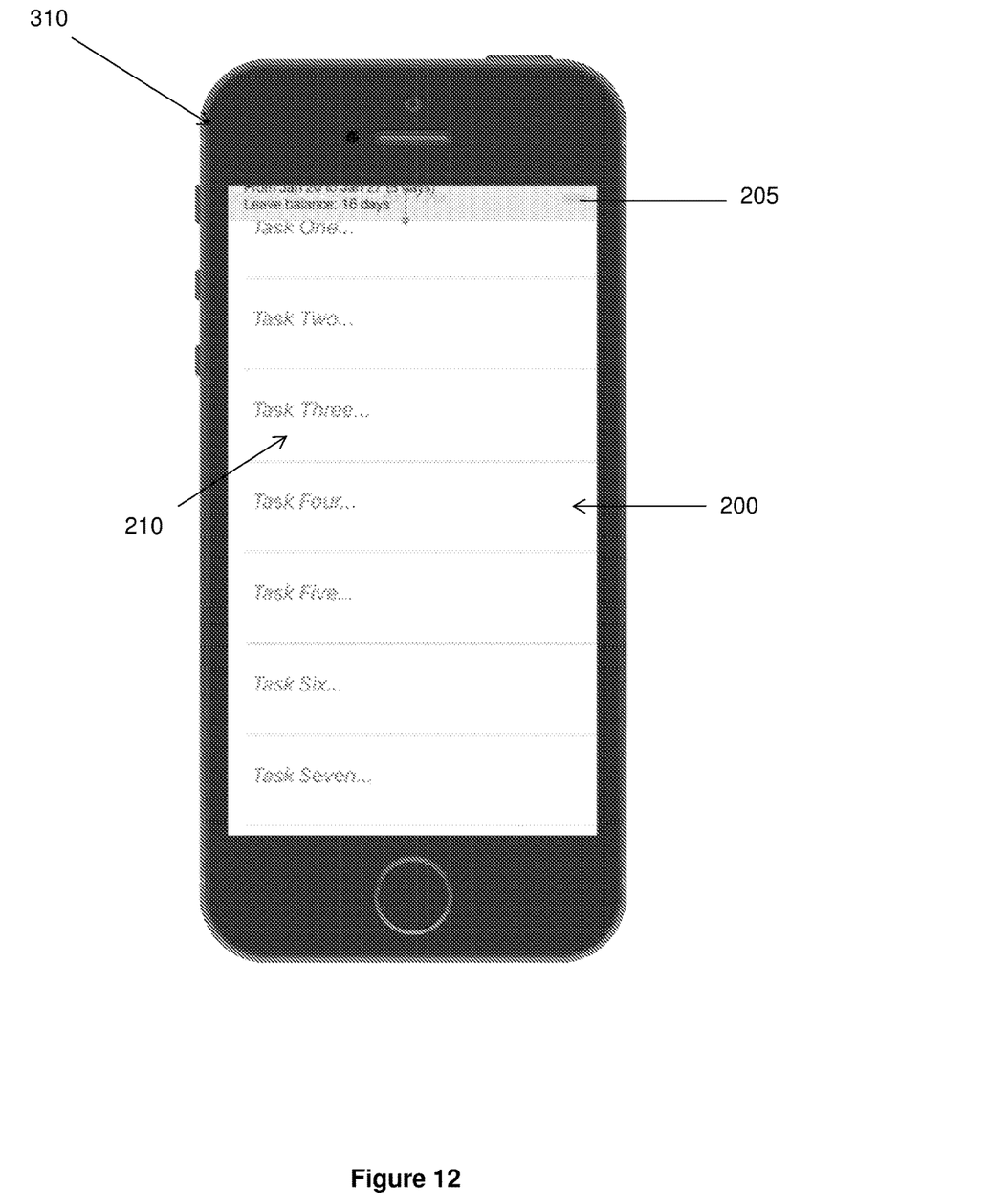
FIGS. 12 to 16 are example mobile screenshots of another embodiment of the present invention in which the method is initiated by receipt of a push notification.
Figure 13:
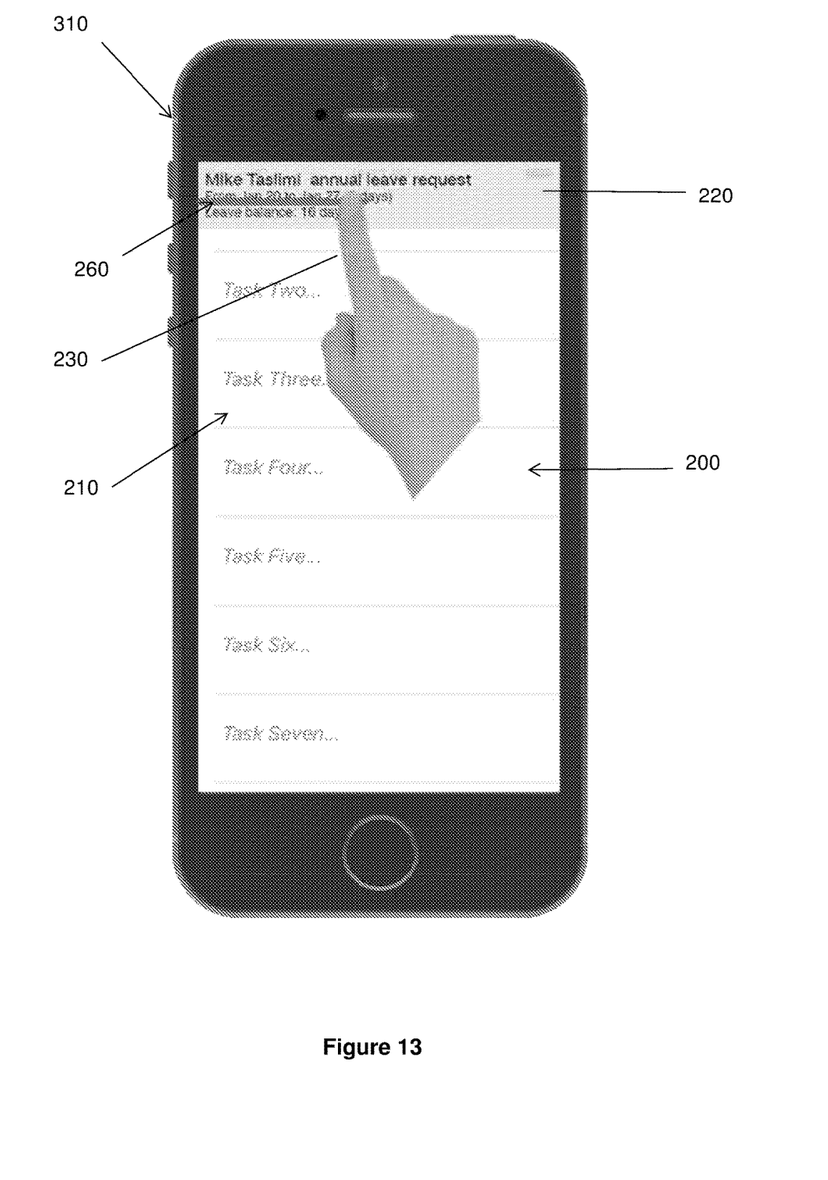
Figure 14:
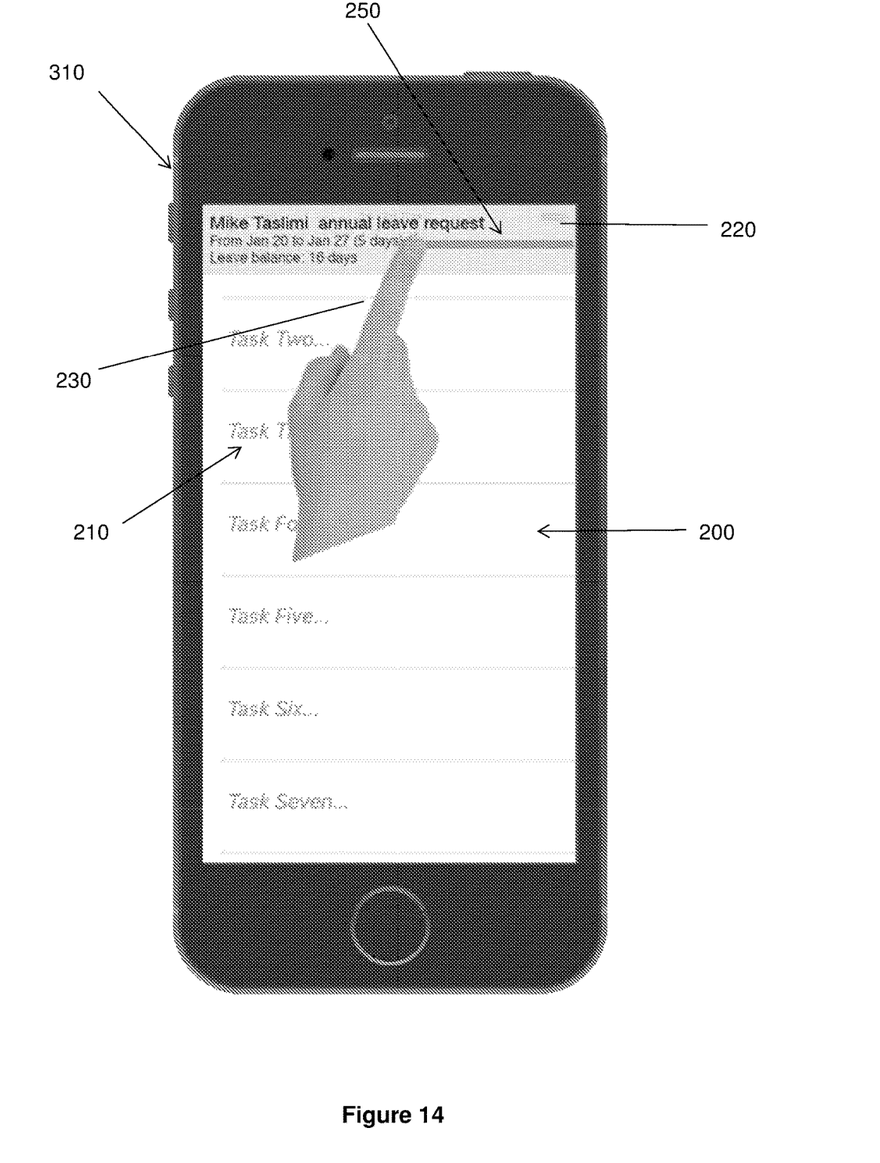
Figure 15:
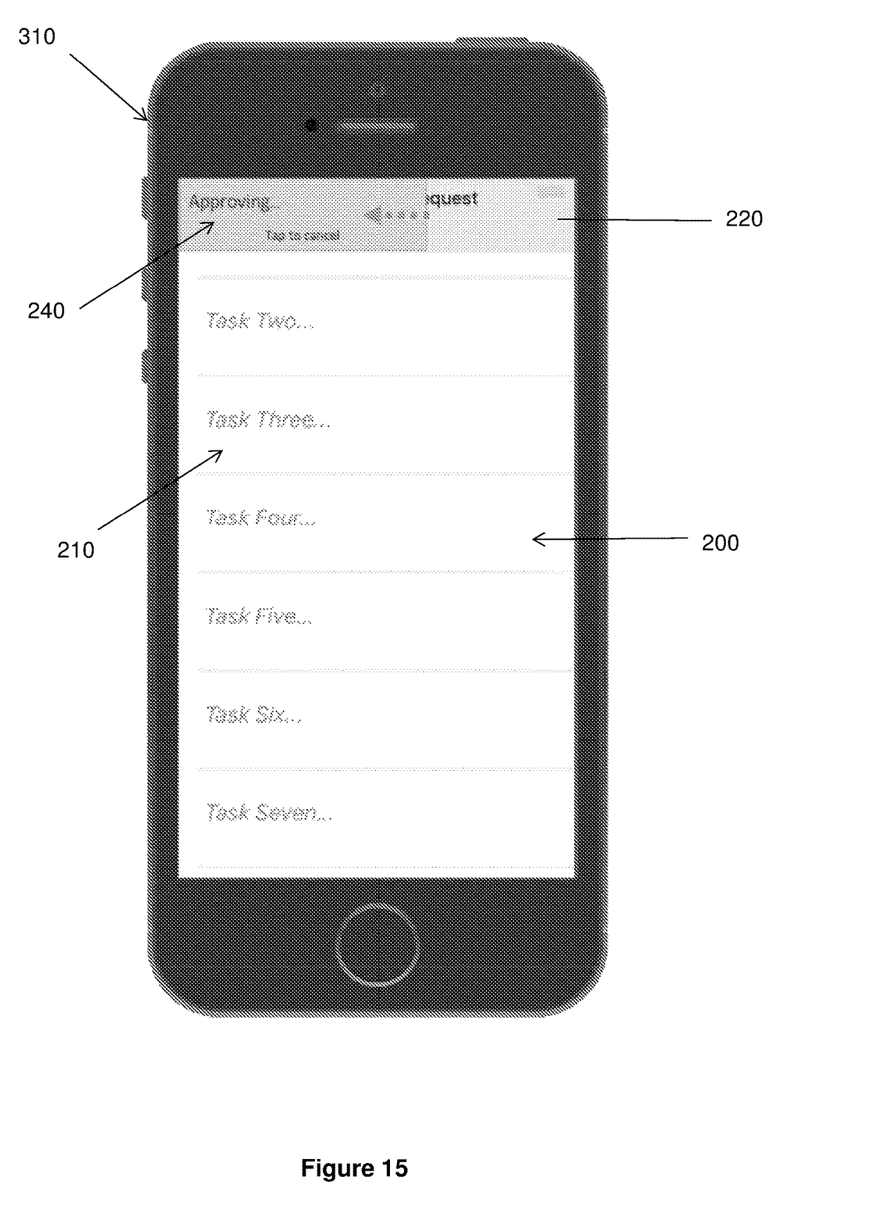
Figure 16:
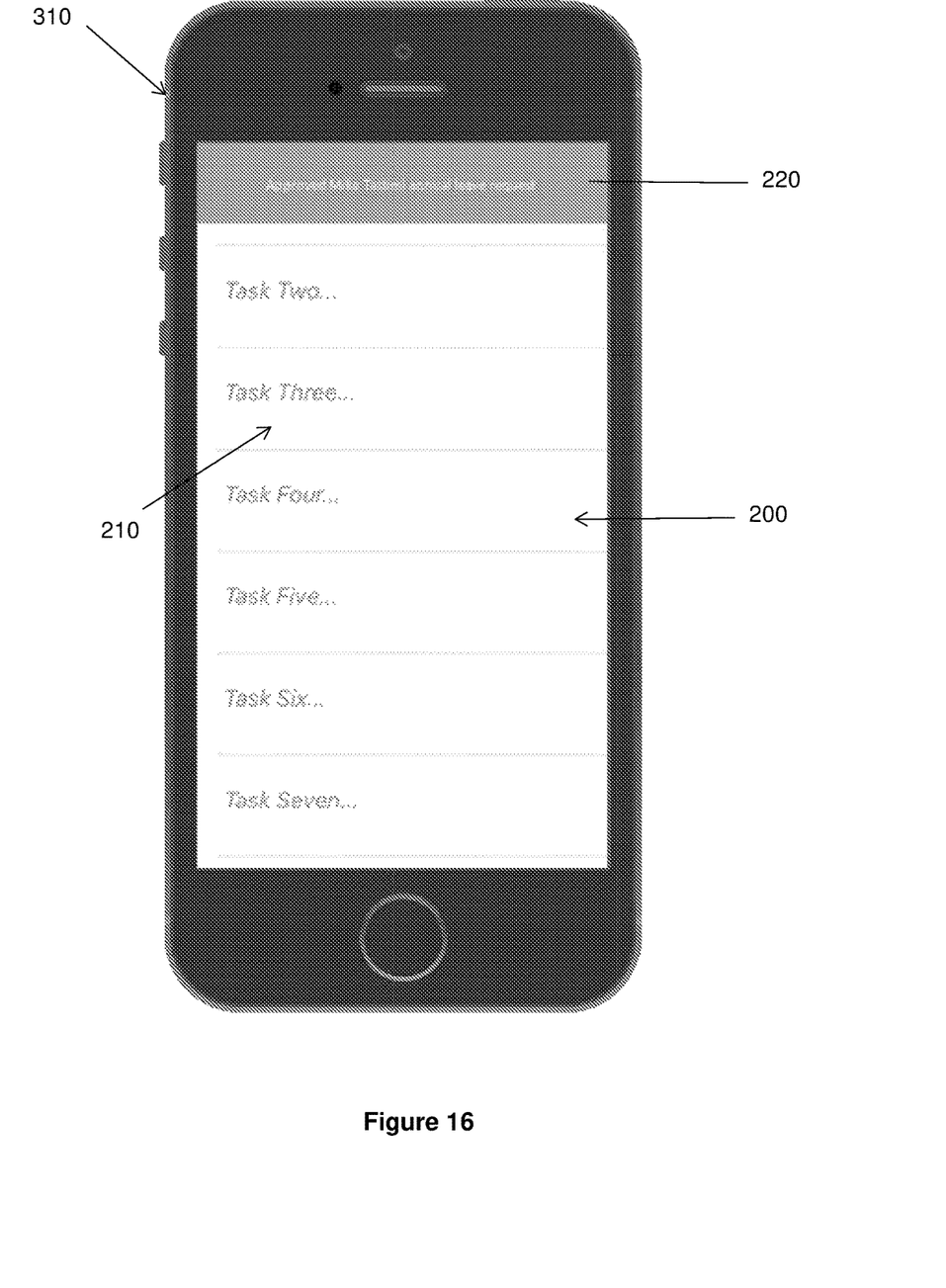

FIGS. 12 to 16 are example mobile screenshots of another embodiment in which the method 100 is initiated by receipt of a push notification 205, such as a message or alert, received at the mobile device 310 and displayed on the touch-sensitive display 200. For example, as illustrated in FIG. 12, a new task 220 arrives via the push notification 205 and slides in from the top of the display 200. The method 100 is then implemented in the same general fashion as described above with reference to FIGS. 2 to 9. For example, as illustrated in FIG. 13, a user swipes 230 from left to right to start rejecting the task 220 displayed in a task list 210. Once the user's finger reaches the far right of the display 200 and the user lets go of the swipe gesture 230, a rejection countdown 240 starts. Alternatively, referring to FIG. 14, the user swipes 230 from right to left to start approving the task 220. Once the user's finger reaches the far left of the display 220 and the user lets go of the swipe gesture 230, the approval countdown 240 starts. As illustrated in FIG. 15, the approval process starts and gives the user a predetermined number of seconds to cancel it by just tapping on the box. While the countdown 240 proceeds, the overlying approval box starts fading out from right to left. Referring to FIG. 16, once the predetermined number of seconds has passed, the approval box reaches the far left side of the display 200 and the task 220 gets approved, slides up the display 200 and a confirmation box appears at the top of the display 200.

Some example embodiments of the present disclosure provide touch gesture interfaces that are useful for managing workflow tasks in touch screen mobile devices.

For the purpose of this specification the word "comprising" means "including but not limited to", and the word "comprises" has a corresponding meaning.

The above embodiments have been described by way of example only and modifications are possible within the scope of the claims that follow.

The invention claimed is:

1. A method, comprising:
   displaying, on a touch-sensitive display of a mobile device, a workflow action within a workflow defined by a business workflow application;
   displaying an indicator of a user-selectable swipe gesture associated with a user approval of the workflow action;
   detecting the swipe gesture on the touch-sensitive display that indicates the user approval of the workflow action;
   in response to the swipe gesture, displaying a visual indicator indicating user approval of the workflow action that is visually distinguishable by color from an indicator used to indicate that the workflow action has been rejected and displaying a countdown timer associated with the workflow action on the touch-sensitive display over the workflow action to enable the user approval of the workflow action to be confirmed or denied by the user within a countdown time displayed by the countdown timer using a different gesture than the swipe gesture; and
   after the countdown timer is displayed in response to the swipe gesture, and responsive to either the user approval of the workflow action being confirmed by the user or the countdown timer expiring without the user approval of the workflow action being denied by the user, updating the workflow within the business workflow application to record the workflow action as approved.

2. The method of claim 1, wherein the swipe gesture comprises a left or right horizontal swipe.

3. The method of claim 1, wherein the mobile device is a smartphone, a tablet, or a combination thereof.

4. The method of claim 1, comprising displaying the workflow action as a push notification on the touch-sensitive display of the mobile device.

5. A non-transitory computer-readable medium comprising computer-readable instructions, wherein execution of the computer-readable instructions by one or more computing devices causes the one or more computing devices to:
   display, on a touch-sensitive display of a mobile device, a workflow action within a workflow defined by a business workflow application;

display an indicator of a user-selectable swipe gesture associated with a user approval of the workflow action;

detect the swipe gesture on the touch-sensitive display that corresponds to approval of the workflow action;

in response to the swipe gesture, display a visual indicator indicating user approval of the workflow action that is visually distinguishable by color from an indicator used to indicate that the workflow action has been rejected and display a countdown timer associated with the workflow action on the touch-sensitive display over the workflow action to enable the user approval of the workflow action to be confirmed or denied by the user within a countdown time displayed by the countdown timer using a different gesture than the swipe gesture; and after the countdown timer is displayed in response to the swipe gesture, and responsive to either the user approval of the workflow action being confirmed by the user or the countdown timer expiring without the user approval of the workflow action being denied by the user, update the workflow within the business workflow application to record the workflow action as approved.

6. The method of claim 1, further comprising:

after the countdown timer is displayed in response to the swipe gesture, responsive to a user denial of the user approval of the workflow action, redisplaying the workflow action for user approval without recording the workflow action as approved in the business workflow application.

7. The method of claim 1, further comprising:

displaying the workflow action in a list of workflow actions; and after the countdown timer is displayed in response to the swipe gesture, and responsive to either the user approval of the workflow action being confirmed by the user or the countdown timer expiring without the user approval of the workflow action being denied by the user, removing the workflow action from the list of workflow actions.

8. The method of claim 7, further comprising:

after detecting the user approval, display an approval box that fades out to indicate the progress of the countdown timer.

9. The method of claim 1, further comprising:

after detecting the user approval, display an approval box that fades out to indicate the progress of the countdown timer.

10. A method, comprising:

displaying, on a touch-sensitive display of a mobile device, a workflow action within a workflow defined by a business workflow application;

displaying an indicator of a user-selectable swipe gesture associated with a user approval of the workflow action;

detecting the swipe gesture on the touch-sensitive display that indicates the user approval of the workflow action;

in response to the swipe gesture, displaying a visual indicator indicating user approval of the workflow action that is visually distinguishable from an indicator used to indicate that the workflow action has been rejected;

displaying a countdown timer and approval box associated with the workflow action on the touch-sensitive display over the workflow action to enable the user approval of the workflow action to be confirmed or denied within a countdown time displayed by the countdown timer by the user using a different gesture than the swipe gesture, the approval box fading out to indicate the progress of the countdown timer; and after the countdown timer is displayed in response to the swipe gesture, and responsive to either the user approval of the workflow action being confirmed by the user or the countdown timer expiring without the user approval of the workflow action being denied by the user, updating the workflow within the business workflow application to record the workflow action as approved.

11. The method of claim 10, wherein the countdown timer for user approval is visually distinguishable from a countdown timer for user rejection by one or more of different colors, different labels, and different directions.

* * * * *